April 8, 1952   O. K. JACKSON   2,592,425
PLUMB BOB
Filed Dec. 5, 1949
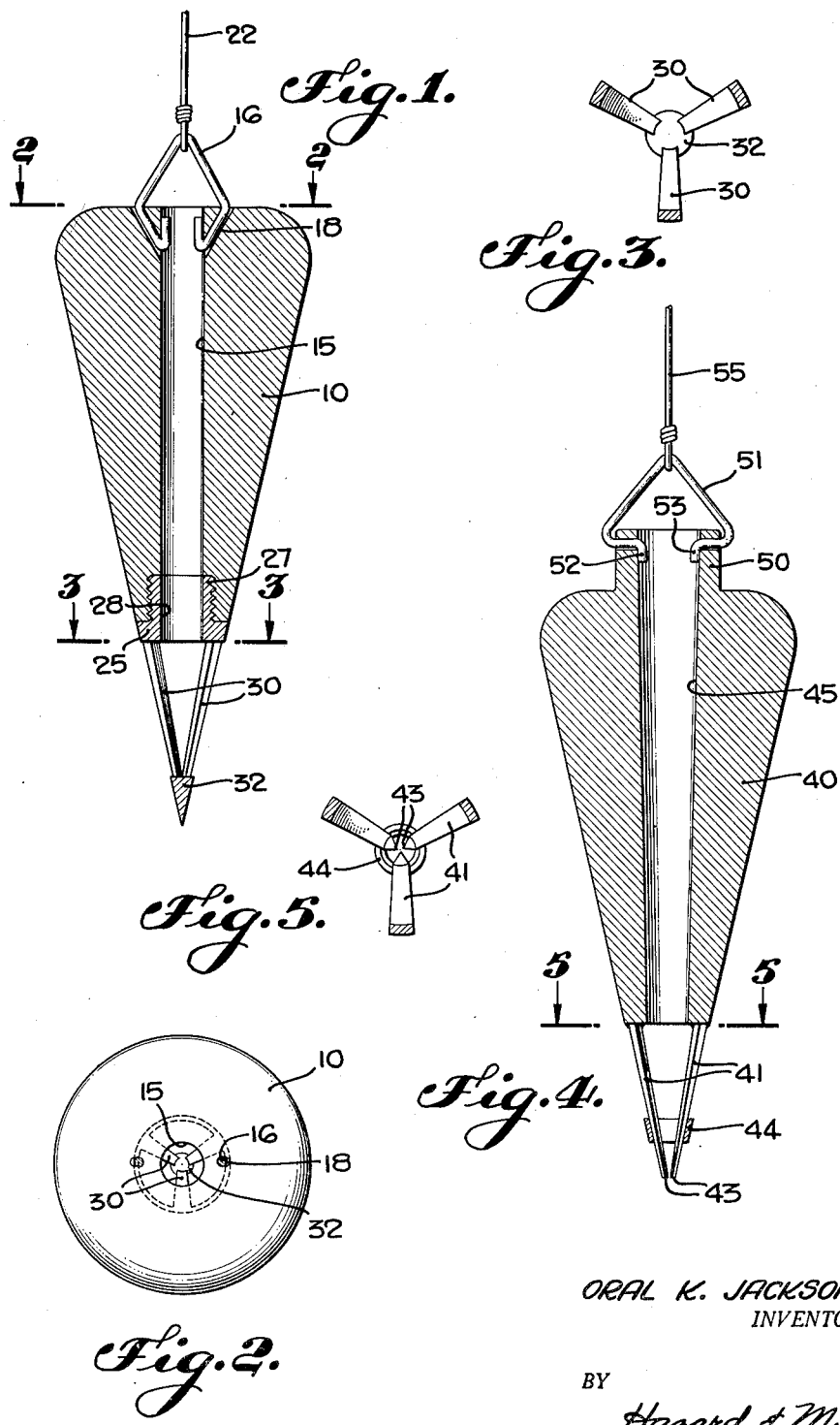
ORAL K. JACKSON,
INVENTOR.
BY
Hazard & Miller
ATTORNEYS Patented Apr. 8, 1952

2,592,425

UNITED STATES PATENT OFFICE 2,592,425

PLUMB BOB

Oral K. Jackson, Montebello, Calif.

Application December 5, 1949, Serial No. 131,110

6 Claims. (Cl. 33—216)

This invention relates to plumb bobs.

One main use of plumb bobs is in chaining in which the chainman locates the plumb bob and string at the end of the chain or tape and then sighting down the side of the plumb bob approximates a point which he is desirous of locating, the point being a nail or other similar member. This method of locating a point has proved awkward and cumbersome since it is rather difficult for the chainman to make an accurate measurement by sighting down the side of the plumb bob since the plumb bob has a somewhat conical shape.

The main object of the present invention is to provide a plumb bob which will permit easy and accurate centering of the plumb bob over a desired point.

Another object of the present invention is to provide a plumb bob having a bore down the center thereof to permit sighting by a chainman or the like directly down the string and through the plumb bob.

Another object of the present invention is to provide a plumb bob having an axial bore and a bail for the plumb bob to support the plumb bob, the bail being so constructed as not to interfere with sighting through the plumb bob.

Another object of the present invention is to provide an improved end or point for a plumb bob of the type described.

With the foregoing and other objects in view, which will be made manifest in the following detailed description and specifically pointed out in the appended claims, reference is had to the accompanying drawings for an illustrative embodiment of the invention, wherein:

Figure 1 is a sectional view in elevation of a plumb bob embodying the present invention;

Fig. 2 is a plan view taken along lines 2—2 of Fig. 1;

Fig. 3 is a plan view taken along lines 3—3 of Fig. 1;

Fig. 4 is a sectional view in elevation of a modified form of the invention; and Fig. 5 is a plan view in section along the lines 5—5 of Fig. 4.

Referring to the accompanying drawings wherein similar reference characters designate similar parts throughout, Fig. 1 discloses a plumb bob having a body 10 with an axial bore 15 through the center thereof. There is a bail 16 composed of fine wires having lower ends passing through inclined passageways 18 provided in body 10, said ends being bent upwardly as shown to retain the bail in body 10. A string 22 may be fastened to the bail 20 at the upper center portion thereof.

The lower portion of body 10 is internally threaded to receive a point providing member 25 which has a threaded nipple 27 receivable by body 10, nipple 27 having a bore 28 in alignment with bore 15 of body 10. There are arms 30 which in the particular embodiment disclosed in Figs. 1 through 3, are three in number and are integral with or permanently fastened to point providing member 25. The lower extremities of arms 30 have a point 32 provided integrally therewith or permanently fastened thereto. The point 32 is small relative to the other parts of the plumb bob, and if the plumb bob is being used to locate over a nail head, the point 32 will be small enough so that the chainman or other person will be able to see the nail head or the point 32 will just cover the nail head or other location point so that an accurate and easy positioning of the plumb bob can be obtained.

A modified form of the invention is disclosed in Figs. 4 and 5, the plumb bob in this case having a body 40 with arms 41 provided integrally therewith or permanently fastened thereto. It is contemplated that the arms 41 may be provided on a separate extension piece as shown in Fig. 1, if desired. The arms 41 extend downwardly to points 43 which are spaced from one another as shown in Fig. 5 so that a chainman or the like can look through the plumb bob directly onto the nail or location point over which it is desired to align the plumb bob. There is a band 44 enclosing arms 41 and fastened to the arms by any suitable means such as by soldering or welding. In this form of the invention there is a tapered axial bore 45 through the center of the body 40. By providing a tapered axial bore, the chainman is allowed to move his head somewhat more in sighting down through the central bore and in some cases making alignment of the plumb bob with a location point easier, particularly if the location point is located in a place which is not too well lighted. There is a boss 50 to which a bail 51 is fastened, said bail having ends 52 and 53 extending through boss 50 and bent to retain the bail within the boss and adapted to have a string 55 fastened thereto. It is contemplated that the type of connection of bail 51 and boss 50 may be provided on a plumb bob having a removable lower extension such as shown in Fig. 1.

It will be appreciated that the present invention allows rapid and accurate positioning of the plumb bob over a point in question and the operator does not have to approximate the positioning of the plumb bob by sighting down the side of the plumb bob, but this can be accomplished by merely looking down the string and through the plumb bob and locating the plumb bob above the desired location point.

Various changes may be made in the details of construction without departing from the spirit and scope of the invention as defined by the appended claims, wherein:

I claim:

1. A plumb bob having a body portion, a bottom extension member connectable to the body, the body having a bore through the center thereof, the extension providing arms extending conically together, and a bail at the top of the plumb bob to which a supporting string or the like may be fastened.

2. A plumb bob having a body, a bottom extension member connectable to the body, the body having a bore through the center thereof, the extension providing arms extending conically together, and means at the top of the body adapted to receive a string for supporting the plumb bob, said means leaving the bore substantially unobstructed as viewed through the top of the plumb bob.

3. A plumb bob having a body with a bore through the center thereof, arms on the lower portion of the body extending down toward a point axially beneath the bore, and a bail at the top of the plumb bob to which a supporting string or the like may be fastened.

4. A plumb bob having a body with an axial bore, arms on the lower portion of the body extending down toward a point axially beneath the bore, and means at the top of the body adapted to receive a string for supporting the plumb bob.

5. A plumb bob having a body, a bottom extension member threadedly received by the body, the body having an axial bore extending therethrough, and arms on the extension extending downwardly toward a point axially beneath the bore.

6. A plumb bob having a body, a bottom extension member threadedly received by the body, the body having an axial bore extending therethrough, arms on the extension extending downwardly toward a point axially beneath the bore, and fine wires secured to the top of the body and fastened together to provide a bail for supporting the body without obstructing the line of sight through the plumb bob.

ORAL K. JACKSON.

REFERENCES CITED

The following references are of record in the file of this patent:

UNITED STATES PATENTS

| Number | Name | Date |
|---|---|---|
| 928,477 | Sloggett | July 20, 1909 |
| 1,246,960 | Logan | Nov. 20, 1917 |
| 1,858,384 | Andre | May 17, 1932 |
| 2,113,993 | McLaughlin | Apr. 12, 1938 |